(No Model.) 2 Sheets—Sheet 1.
S. HAINKEL.
RIDING SADDLE.
No. 409,323. Patented Aug. 20, 1889.
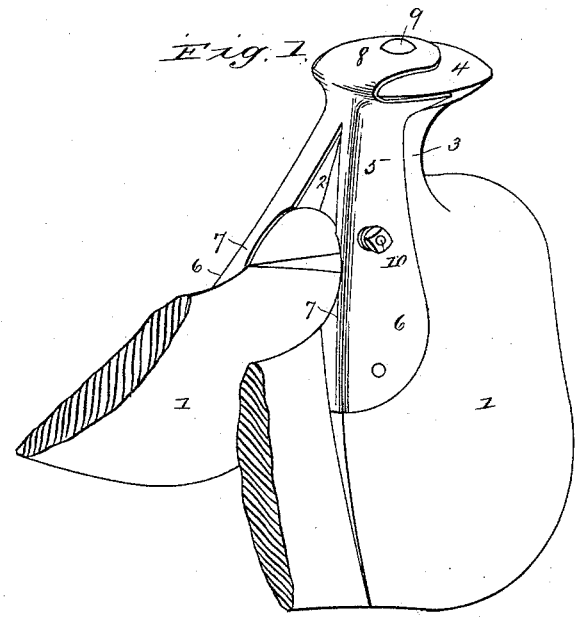
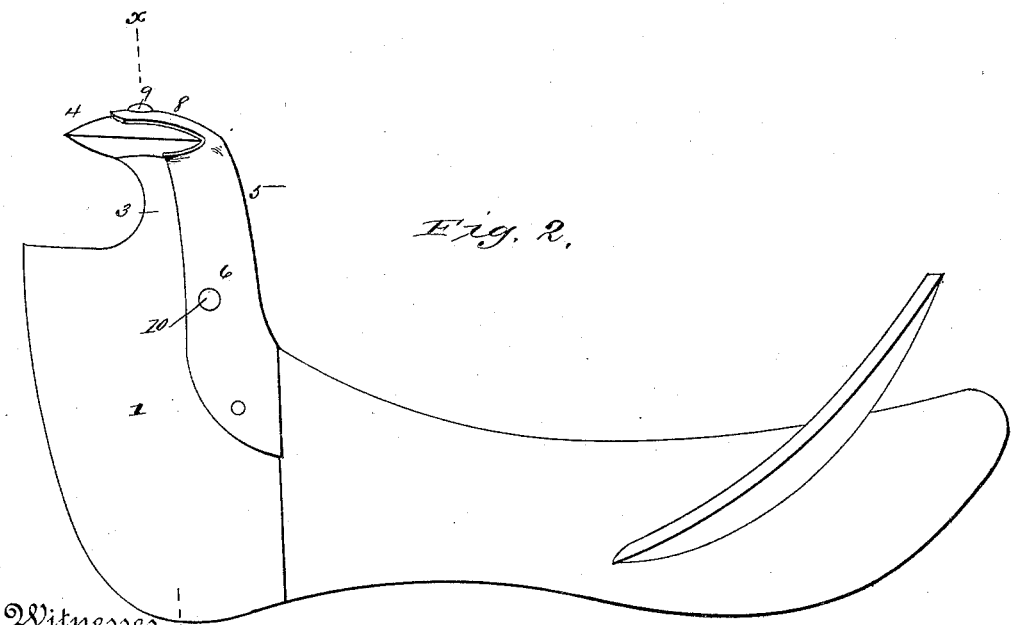
Witnesses
E. L. Smith
Thomas Durant
Inventor
Sigel Hainkel
By his Attorneys
Church & Church (No Model.) 2 Sheets—Sheet 2.
S. HAINKEL.
RIDING SADDLE.
No. 409,323. Patented Aug. 20, 1889.
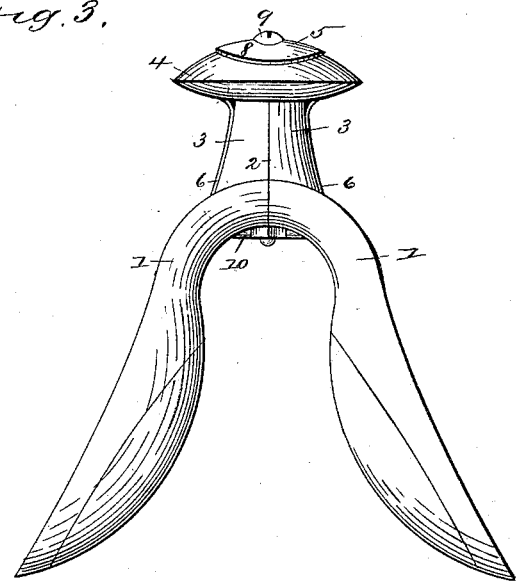
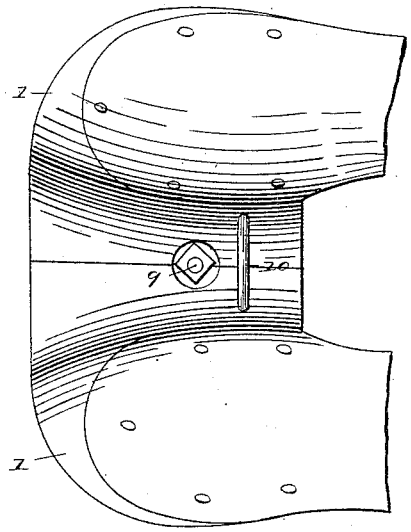
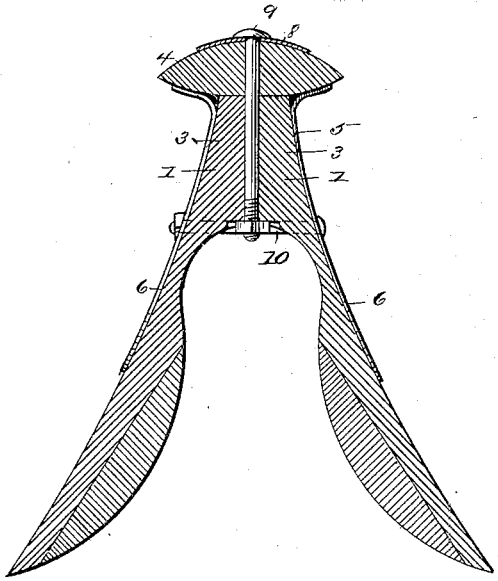
Witnesses
E. S. Smith
Thomas Durant
Inventor
Sigel Hainkel,
By his Attorneys
Church & Church

UNITED STATES PATENT OFFICE.

SIGEL HAINKEL, OF QUINCY, ILLINOIS, ASSIGNOR OF ONE-HALF TO LOUIS WOLF, OF SAME PLACE.

RIDING-SADDLE.

SPECIFICATION forming part of Letters Patent No. 409,323, dated August 20, 1889.

Application filed May 14, 1889. Serial No. 310,700. (No model.)

*To all whom it may concern:*

Be it known that I, SIGEL HAINKEL, of Quincy, in the county of Adams and State of Illinois, have invented certain new and useful Improvements in Saddle-Trees; and I do hereby declare the following to be a full, clear, and exact description of the same, reference being had to the accompanying drawings, forming a part of this specification, and to the figures and letters of reference marked thereon.

This invention relates to that class of saddle-trees known as "glued-fork trees;" and it has for its object to provide a tree of this class which shall combine the lightness, strength, and durability of a natural-fork tree, and yet be very much cheaper to manufacture.

I will first describe the construction of my improved tree, and will then point out what I deem to be its novel features in the claims at the close of this specification.

In the drawings, Figure 1 represents a perspective view of a saddle-tree constructed in accordance with my invention. Fig. 2 is a side view of the same; Fig. 3, a front view, and Fig. 4 a bottom view; Fig. 5, a sectional view taken on the line $x\ x$ of Fig. 2.

Similar reference-numbers in the several figures indicate the same parts.

The main wooden portion of the tree consists of two parts 1 1, glued together, as shown at 2, and having upper extensions 3 3, which combined form the neck of the tree upon which the wooden cap-piece 4 is supported.

5 is a metallic strengthening-piece having wings 6 6, which extend down upon and are fastened to the wooden parts 1 1 by means of bolts, rivets, or otherwise, and having also short inwardly-projecting flanges 7, extending under and assisting to support the cap-piece 4, and a broad upper flange 8, which projects over and rests upon the top of the said cap-piece 4. This strengthening-piece 5 and the wooden parts 1 1 and cap-piece 4 are all firmly united and bound together by means of a bolt 9, which passes down through the flange 8, the cap-piece, and the parts 1 1, and a cross-bolt 10, which passes through the wings 6 6 and parts 1 1, both said bolts being headed or provided with screw-nuts, as preferred. Constructed in this manner the tree can be manufactured at little cost, and besides being strong and durable, presents a very neat appearance.

I claim as my invention—

1. In a riding-saddle, the strengthening-piece 5, having the wings 6 6, the short projecting flanges 7 7, and the broad overhanging flange 8, substantially as described.

2. The combination, with the frame of the saddle-tree and the cap-piece, of the metallic strengthening-piece having the wings 6 6, short flanges 7 7, broad overhanging flange 8, and the vertical bolt 9 and cross-bolt 10, for securing the parts together, substantially as described.

3. The combination, with the wooden saddle-tree frame made in two parts, as described, and with the wooden cap-piece, of the metallic strengthening-piece having the wings, the short flanges, the broad overhanging flange, and the vertical and horizontal bolts, substantially as described.

SIGEL HAINKEL.

Witnesses:
L. E. EMMONS,
L. E. EMMONS, Jr.